US009218091B2

(12) United States Patent
Chen

(10) Patent No.: US 9,218,091 B2
(45) Date of Patent: Dec. 22, 2015

(54) OPTICAL TOUCH PANEL ASSEMBLY AND LIGHT SENSOR THEREOF

(75) Inventor: Hui-Hsuan Chen, Hsinchu (TW)

(73) Assignee: PIXART IMAGING INC., Hsinchu (TW)

( * ) Notice: Subject to any disclaimer, the term of this patent is extended or adjusted under 35 U.S.C. 154(b) by 361 days.

(21) Appl. No.: 13/473,591

(22) Filed: May 16, 2012

(65) Prior Publication Data

US 2013/0021299 A1 Jan. 24, 2013

(30) Foreign Application Priority Data

Jul. 18, 2011 (TW) .............................. 100125331 A

(51) Int. Cl.
*G06F 3/042* (2006.01)

(52) U.S. Cl.
CPC ............ *G06F 3/0428* (2013.01); *G06F 3/0421* (2013.01); *G06F 3/0425* (2013.01)

(58) Field of Classification Search
CPC ..... G06F 3/0421; G06F 3/0428; G06F 3/042; G06F 3/0425; G02B 5/045
USPC ........................................ 345/175; 178/18.09
See application file for complete search history.

(56) References Cited

U.S. PATENT DOCUMENTS

| | | | |
|---|---|---|---|
| 6,285,359 B1* | 9/2001 | Ogasawara et al. ............ | 345/175 |
| 8,259,088 B1* | 9/2012 | D'Souza ........................ | 345/175 |
| 2001/0026268 A1* | 10/2001 | Ito ................................. | 345/175 |
| 2003/0006973 A1* | 1/2003 | Omura et al. ................. | 345/175 |
| 2003/0085871 A1* | 5/2003 | Ogawa .......................... | 345/158 |
| 2004/0061689 A1* | 4/2004 | Ito ................................. | 345/175 |
| 2004/0252091 A1* | 12/2004 | Ma et al. ........................ | 345/87 |
| 2008/0068352 A1* | 3/2008 | Worthington et al. ........ | 345/175 |
| 2009/0309844 A1* | 12/2009 | Woo et al. ..................... | 345/173 |
| 2010/0164883 A1* | 7/2010 | Ahn et al. ..................... | 345/173 |
| 2010/0181578 A1* | 7/2010 | Li et al. .......................... | 257/82 |
| 2010/0214268 A1* | 8/2010 | Huang et al. ................. | 345/175 |
| 2010/0253637 A1* | 10/2010 | Lieberman et al. ........... | 345/173 |
| 2010/0295821 A1* | 11/2010 | Chang et al. .................. | 345/175 |
| 2010/0315380 A1* | 12/2010 | Yen et al. ...................... | 345/175 |
| 2011/0025620 A1* | 2/2011 | Jakobsen et al. .............. | 345/173 |
| 2011/0061950 A1* | 3/2011 | Cheng et al. ............... | 178/18.09 |
| 2011/0096032 A1* | 4/2011 | Nakanishi ..................... | 345/175 |
| 2011/0102371 A1* | 5/2011 | Chang et al. .................. | 345/175 |
| 2011/0134080 A1* | 6/2011 | Kiyose .......................... | 345/175 |
| 2011/0163996 A1* | 7/2011 | Wassvik et al. ............... | 345/175 |

FOREIGN PATENT DOCUMENTS

| | | |
|---|---|---|
| CN | 101976156 A | 2/2011 |
| CN | 102043540 A | 5/2011 |
| TW | M363080 U1 | 8/2009 |

* cited by examiner

*Primary Examiner* — Michael J Eurice
(74) *Attorney, Agent, or Firm* — Cheng-Ju Chiang

(57) ABSTRACT

A light sensor includes a case, a light reflective layer and a light sensing component. The case has a light incident side. The light incident side is partially covered by the light reflective layer to cause the light incident side to form a light incident area uncovered by the light reflective layer and a light reflective area covered by the light reflective layer and located beside the light incident area. The light sensing component is disposed within the case and has a light sensing surface facing toward the light incident area. An optical touch panel assembly incorporating a plurality of the light sensors is also provided. The optical touch panel assembly includes a touch panel, two above-mentioned light sensors oppositely disposed at two sides of the touch panel.

13 Claims, 4 Drawing Sheets

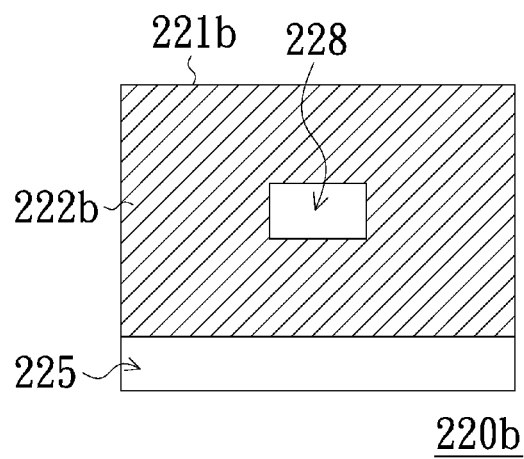
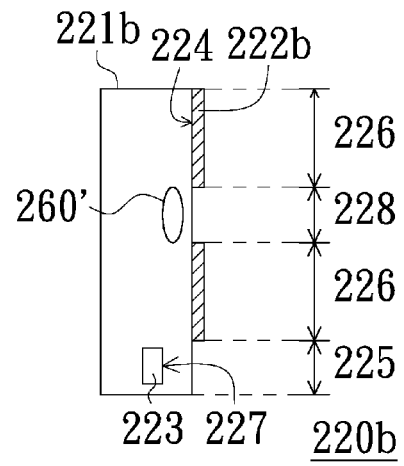
FIG. 6  FIG. 7
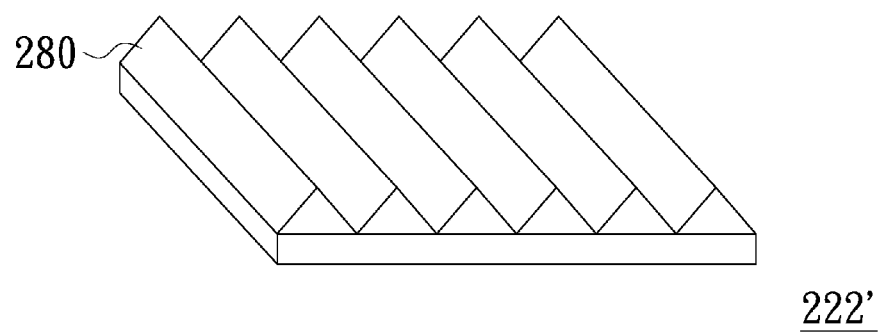
FIG. 8

OPTICAL TOUCH PANEL ASSEMBLY AND LIGHT SENSOR THEREOF

TECHNICAL FIELD

The present invention relates to touch panel assemblies, and more particularly to an optical touch panel assembly and a light sensor thereof.

BACKGROUND

Touch panels are widely applied to many electronic products, such as mobile phones, personal digital assistants (PDAs), digital cameras, media players, computers, satellite navigation devices, touch screens, etc. The currently existing touch panels are divided into many types, such as resistive touch panels, capacitive touch panels, optical touch panels, among which the optical touch panels have the lowest cost.

Referring to FIG. 1, there shows a schematic view of an optical touch panel assembly 100. The optical touch panel assembly 100 has a substantially rectangular touch panel 101 and includes three light sensors 110a, 110b, 110c, three light sources 120a, 120b, 120c, and four light reflective bars 130a, 130b, 130c, 130d. The three light sources 120a, 120b, 120c are disposed on the three light sensors 110a, 110b, 110c, respectively, and emit lights toward the touch panel 101. The four light reflective bars 130a, 130b, 130c, 130d are disposed adjacent to four side edges of the touch panel 101, respectively. The three light sensors 110a, 110b, 110c are disposed at three corners of the touch panel 101, respectively, and each light sensor is positioned at a joint of corresponding two adjacent light reflective bars. The light sensors 110a, 110b are respectively positioned at two ends of one diagonal line 102 of the touch panel 101.

Each light sensor is used for sensing the light reflective brightness of a corresponding light reflective bar. For example, the light sensor 110a is used for sensing the light reflective brightness of the light reflective bars 130a, 130b. The light sensor 110a has a plurality of linearly arrayed pixels therein, and each pixel is used for sensing a specific area of the light reflective bar 130a or 130b. When a shade O such as a finger moves or operates within the touch panel 101, some of the pixels of the light sensor 110a are shaded by the shade O, such that the brightness sensed by the some of the pixels of the light sensor 110a is lower than the brightness sensed by the other pixels of the light sensor 110a. Similarly, the other light sensors 110b, 110c also have some pixels are shaded by the shade O, and the brightness sensed by the shaded pixels is lower than the brightness sensed by the other pixels of the light sensors 110b, 110c. The position information of the shade O can be calculated according to the brightness change sensed by the light sensors 110a, 110b, 110c.

As the light sensors 110a, 110b, 110c are disposed at the corners of the touch panel 101, there always needs to provide a large receiving gap between every two adjacent light reflective bars for receiving a light sensor therein. However, in use, the receiving gaps form dark areas that cannot be sensed by the light sensors. In terms of the light sensor 110a, some pixels of the light sensor 110a face towards the light sensor 110b instead of a light reflective bar. In other words, the some pixels of the light sensor 110a are faced with a dark area formed by the light sensor 110b. Therefore, the brightness sensed by the some pixels of the light sensor 110a is sensibly lower than the brightness sensed by the other pixels of the light sensor 110a. Thus, the light source 120b disposed on the light sensor 110b is provided and used for supplementing light to the light sensor 110a, thereby ensuring the brightness sensed by all of the pixels of the light sensor 110a are uniform when no shade O is present. Therefore, as the light sensor 110a works, the light source 120a operates in a normal light-emitting state, while the light source 120b operates in a supplementary light-emitting state, the brightness of the normal light-emitting state being higher than that of the supplementary light-emitting state. Similarly, when the light sensor 110b works, the light source 120b operates in a normal light-emitting state, while the light source 120a operates in a supplementary light-emitting state.

As the light sources 120a, 120b of the existing optical touch panel assembly 100 each must have two (i.e., normal and supplementary) light-emitting states in operation, a driving circuit of the light sources 120a, 120b becomes complex.

Therefore, there is room for improvement within the art.

SUMMARY

The present invention relates to a light sensor for application in an optical touch panel assembly. The light sensor includes a case, a light reflective layer and a light sensing component. The case has a light incident side. The light incident side is partially covered by the light reflective layer to cause the light incident side to form a light incident area uncovered by the light reflective layer and a light reflective area covered by the light reflective layer and located beside the light incident area. The light sensing component is disposed within the case and has a light sensing surface facing toward the light incident area.

The present invention further provides an optical touch panel assembly including a touch panel and two light sensors oppositely disposed at two sides of the touch panel. Each light sensor includes a case, a light reflective layer and a light sensing component. The case has a light incident side facing toward the touch panel. The light incident side is partially covered by the light reflective layer to cause the light incident side to form a light incident area uncovered by the light reflective layer and a light reflective area covered by the light reflective layer and located beside the light incident area. The light sensing component is disposed within the case and has a light sensing surface facing toward the light incident area.

BRIEF DESCRIPTION OF THE DRAWINGS

The above objects and advantages of the present invention will become more readily apparent to those ordinarily skilled in the art after reviewing the following detailed description and accompanying drawings, in which:

FIG. 6 is a schematic view of the light sensor according to a further example.

FIG. 7 is a cross sectional view of the light sensor of FIG. 6.

FIG. 8 is a schematic view of a light reflective layer formed on the light sensor according to another example.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
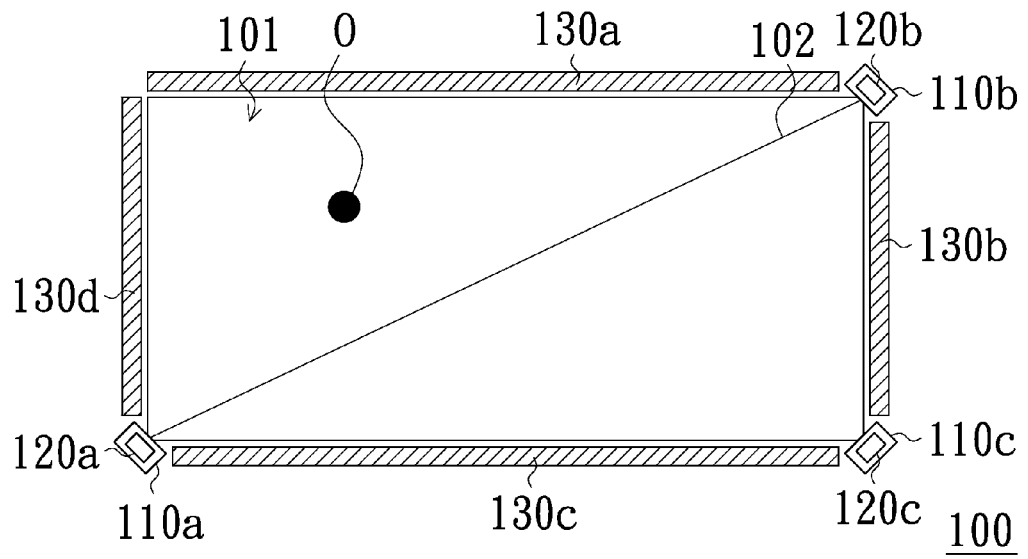
FIG. 1 is a schematic view of an optical touch panel assembly according to the related art.
Figure 2:
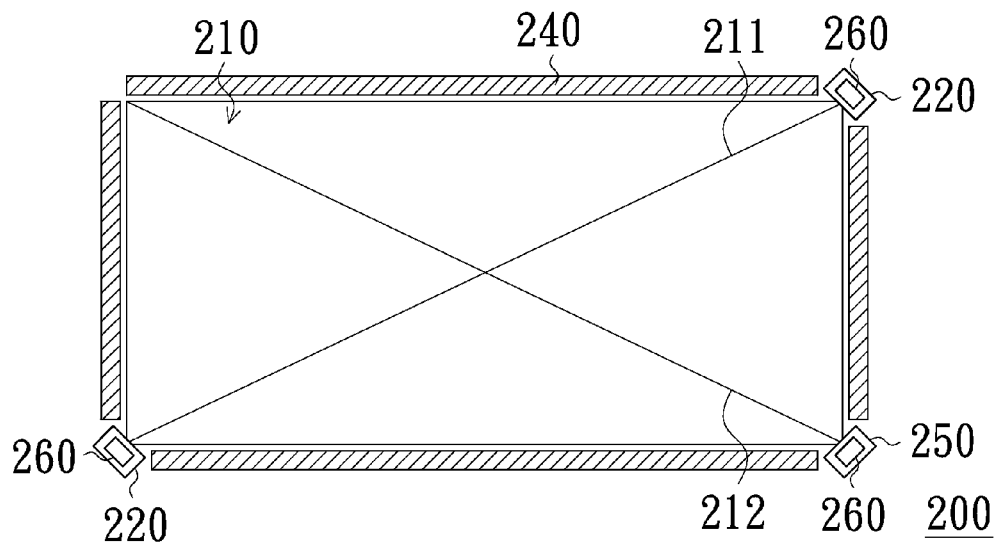
FIG. 2 is a schematic view of an optical touch panel assembly in accordance with a first embodiment of the present invention.

Referring to FIG. 2, there shows a schematic view of an optical touch panel assembly 200 according to a first embodiment. The optical touch panel assembly 200 has a touch panel 210 and includes two first light sensors 220. The two first light sensors 220 are oppositely disposed at two opposite sides of the touch panel 210 such as two opposing corners of the touch panel 210. Specifically, the touch panel 210 is substantially rectangular and includes a first diagonal line 211 and a second diagonal line 212 intersecting with the first diagonal line 211. The two first light sensors 220 are oppositely disposed at two corners of the touch panel 210 and respectively positioned at two ends of the first diagonal line 211 of the touch panel 210. However, it is to be understood that, the two first light sensors 220 are not limited to be assembled to the two corners of the touch panel 210, the touch panel 210 can also have other shapes. In addition, the optical touch panel assembly 200 further includes at least one light reflective bar 240 disposed along a side edge of the touch panel 210. In the illustrated embodiment, there are four light reflective bars 240 assembled around the touch panel 210, and positioned adjacent to four side edges of the touch panel 210, respectively.

The optical touch panel assembly 200 further includes a second light sensor 250 disposed at one end of the second diagonal line 212 of the touch panel 210. Each of the two first light sensors 220 and the second light sensor 250 is equipped with a point light source 260 mounted thereon toward the touch panel 210. The point light source 260 can be a light emitting diode (LED), a laser diode, or other proper light sources. In one embodiment, the point light source 260 can also be replaced by at least one line light source disposed adjacent to at least one side edge of the touch panel 210. The line light source can be a combination of a light guiding bar and a light emitting unit emitting light into the light guiding bar.

Figure 3:
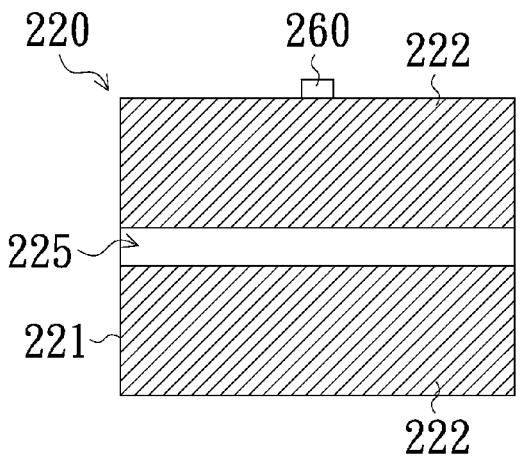
FIG. 3 is a front view of a light sensor and a point light source of the optical touch panel assembly of FIG. 2.
Figure 4:
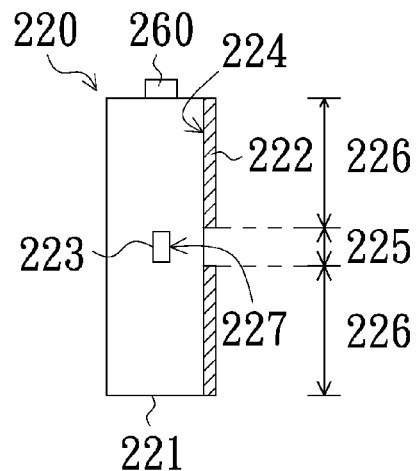
FIG. 4 is a cross sectional view of the light sensor and the point light source of FIG. 3.

Referring to FIG. 2, FIG. 3 and FIG. 4, each first light sensor 220 includes a case 221, a light reflective layer 222 and a light sensing component 223. The case 221 includes a light incident side 224 facing toward the touch panel 210. The light incident side 224 is partially covered by the light reflective layer 222 thereby forming a light incident area 225 uncovered by the light reflective layer 222, and a light reflective area 226 covered by the light reflective layer 222 and positioned beside the light incident area 225. The light sensing component 223 is disposed within the case 221, and has a light sensing surface 227 facing toward the light incident area 225. The light sensing component 223 is located in alignment with the light incident area 225.

Figure 5:
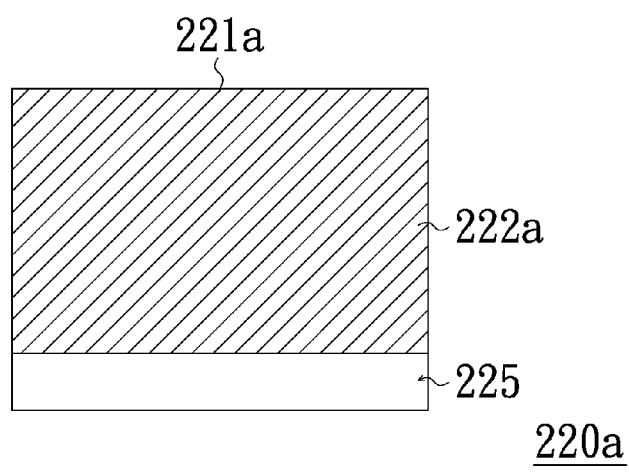
FIG. 5 is a schematic view of the light sensor according to another example.

In the illustrated embodiment, the light incident area 225 of the first light sensor 220 is elongated and substantially rectangular, and the light reflective layer 222 is divided by the light incident area 225 into two parts respectively disposed at two sides (the upper side and the lower side) of the light incident area 225, for reflecting the light emitted by the light source 260. Referring to FIG. 5, there shows a schematic view of the first light sensor 220a according to another example. The light reflective layer 222a of the first light sensor 220a is wholly disposed at the upper side of the light incident area 225. Similarly, the light reflective layer 222a can also be wholly disposed at the lower side of the light incident area 225 (not shown). It is to be understood that, the light reflective layer 222 (222a) can be a planar reflective layer. Namely, the light reflective layer 222 (222a) is a planar surface. In addition, the light reflective layer 222 (222a) can also be a light reflective film adhered to the case 221 (221a). Alternatively, a light reflective material can be coated on the surface of the cases 221 (221a) to serve as the light reflective layer 222 (222a).

The second light sensor 250 can have a substantially same structure as that of the first light sensor 220. Namely, the second light sensor 250 can also form a light reflective layer 222 (222a) thereon. However, it is not necessary to form the light reflective layer 222 (222a) on the second light sensor 250. Also, the second light sensor 250 can have a different structure from that of the first light sensor 220. It is to be understood that, the number of the first light sensors 220 of the optical touch panel assembly 200 is not limited to the above; in one embodiment, the second light sensor 250 can be replaced by a first light sensor 220 and the optical touch panel assembly 200 may include four first light sensors 220 which are assembled to four corners of the touch panel 210, respectively.

Referring to FIGS. 6 and 7, there shows a schematic view of the first light sensor 220b according to a further example. The case 221b of the first light sensor 220b includes a light incident side 224 partially covered by the light reflective layer 222b thereby forming a light incident area 225 uncovered by the light reflective layer 222b, a light emitting area 228 uncovered by the light reflective layer 222b, and a light reflective area 226 covered by the light reflective layer 222b. The first light sensor 220b further includes a point light source 260' assembled in the case 221b and positioned facing toward the light emitting area 228. The point light source 260' is located in alignment with the light emitting area 228. In addition, the light emitting area 228 is a small light-exiting window defined in a center portion of the light reflective layer 222b and is thus surrounded by the light reflective area 226.

It is to be understood that, the light reflective layer 222 (222a, 222b) is not limited to a planar light reflective layer. Referring to FIG. 8, there shows a schematic view of the light reflective layer 222' according to an alternative example. The light reflective layer 222' is a prism sheet mounted on an outer surface of the case 221 (221a, 221b). The light reflective layer 222' includes a plurality of triangular reflective prisms 280 connected to each other in a parallel manner. In another example, each of the reflective prisms 280 is formed by a plurality of pyramids linearly arranged together.

In the optical touch panel assembly 200 the present disclosure, since the light reflective layer 222 (222a, 222b, 222') is provided on the first light sensor 220 (220a, 220b) to reflect the light, it is thus no need to provide an extra light source for supplementing light to the light sensors. Thus, the light sources can have different configurations and arrangements on the optical touch panel assembly 200. Furthermore, a complex driving circuit for controlling the light sources is also not required.

Figure 9:
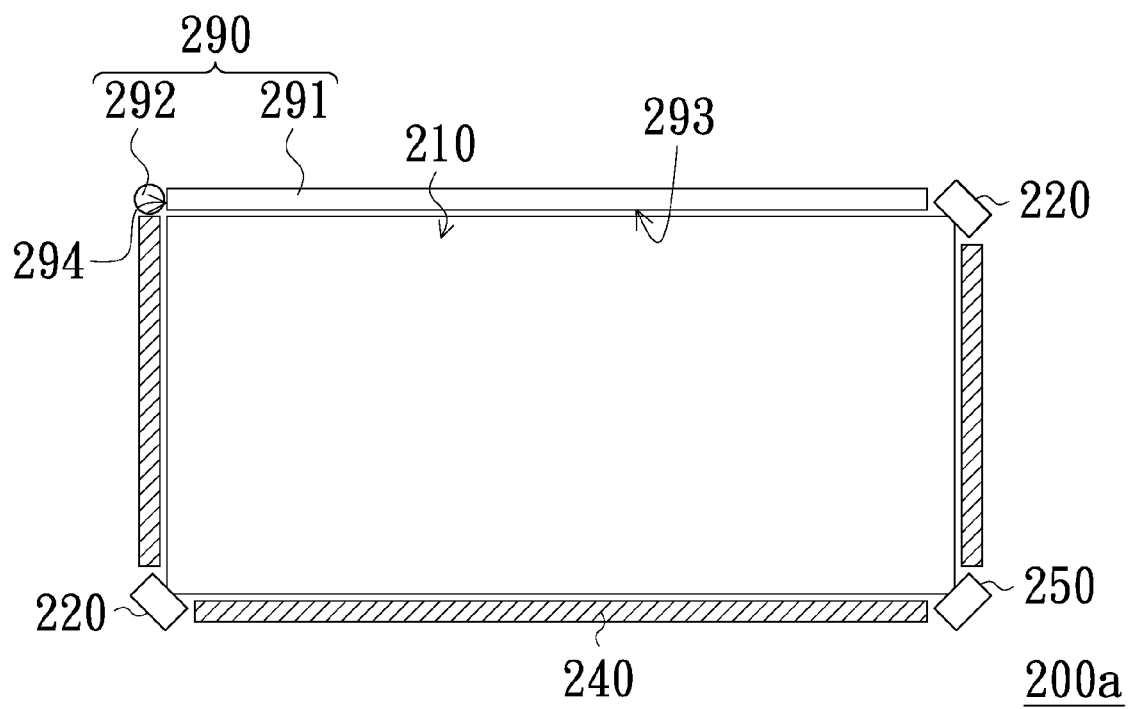
FIG. 9 is a schematic view of an optical touch panel assembly in accordance with a second embodiment of the present invention.

Also referring to FIG. 9, there shows a schematic view of the optical touch panel assembly 200a in accordance with a second embodiment. Since it is not needed to provide an extra light source to supplement light to the first light sensors 220, the point light source 260 of FIG. 2 can be replaced by a linear light source 290. Specifically, the optical touch panel assembly 200a shown in FIG. 9 is similar to the optical touch panel assembly 200 shown in FIG. 2, except for the difference that a light reflective bar 240 of the optical touch panel assembly 200 is replaced by the linear light source 290. The linear light source 290 includes a light guiding bar 291 and a point light source 292. The light guiding bar 291 has a light incident surface 294 and a light emitting surface 293. The point light source 292 is positioned at the light incident surface 294 of the light guiding bar 291. The light emitting surface 293 of the light guiding bar 291 faces toward the touch panel 210 of the optical touch panel assembly 200a. The point light source 292 can be a light emitting diode (LED), a laser diode, or other proper light sources. In another example, all the light reflective bars 240 of the optical touch panel assembly 200 of FIG. 2 are replaced by the linear light sources 290, and every two adjacent linear light sources 290 together share a common point light source 292.

In summary, since the first light sensors each are provided with a light reflective layer on the outer surface of the case to reflect light, the dark areas formed at the locations of the light sensors are efficiently prevented. Since there is no need to further provide an extra light source to supplement light for the dark areas, the optical touch panel assembly efficiently saves light energy and simplifies the driving circuit of the light sources of the optical touch device incorporated with the optical touch panel assembly. In addition, the configurations and arrangements of the light sources for the optical touch device also become more flexible.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An optical touch panel assembly comprising:
   a touch panel;
   two light sensors oppositely disposed at two sides of the touch panel, each light sensor comprising:
   a case having a light incident side facing toward the touch panel;
   a light reflective layer covered on parts of the light incident side to cause the light incident side to form a light incident area uncovered by the light reflective layer and a light reflective area covered by the light reflective layer and located beside the light incident area, wherein a majority portion of the light incident side is covered by the light reflective layer to form the light reflective area for reflecting light, and a minority portion of the light incident side is uncovered by the light reflective layer to form the light incident area for allowing light passing through; and
   a light sensing component disposed within the case and having a light sensing surface facing toward the light incident area; and
   two light sources respectively disposed on two outer surfaces of the cases of the light sensors, the outer surfaces opposite and parallel to bottom surfaces of the cases, and the bottom surfaces resting on the touch panel, wherein the light source disposed on the outer surface of one of the cases is configured to directly emit a light into the light incident side of the other one of the cases and the light reflective layer covered on the light incident side of one of the cases is configured to reflect the light emitted by the light source disposed on the outer surface of the other one of the cases.

2. The optical touch panel assembly according to claim 1, wherein the light incident area is elongated and substantially rectangular, the light reflective layer is divided into two parts disposed on an upper side and a lower side of the light incident area, respectively.

3. The optical touch panel assembly according to claim 1, wherein the light incident area is elongated and substantially rectangular, the light reflective layer is disposed on one of an upper side and a lower side of the light incident area.

4. The optical touch panel assembly according to claim 1, wherein the light reflective layer is a planar reflective layer.

5. The optical touch panel assembly according to claim 1, further comprising at least one light reflective bar assembled adjacent to a side edge of the touch panel.

6. The optical touch panel assembly according to claim 1, further comprising at least one linear light source assembled adjacent to a side edge of the touch panel.

7. The optical touch panel assembly according to claim 1, wherein each of the light sources is configured to emit a light-emergence beam, each of the light sensors is received a light-incidence beam, and the each light-emergence beam is located above the one light-incidence beam.

8. The optical touch panel assembly according to claim 1, wherein the reflective layer is a prism sheet having a plurality of reflective prisms.

9. The optical touch panel assembly according to claim 8, wherein the reflective prisms comprise a plurality of triangular prisms arranged parallel to each other.

10. The optical touch panel assembly according to claim 1, wherein the light incident side further comprises a light emitting area uncovered by the light reflective layer, each light sensor further comprises a point light source disposed within the case and positioned facing toward the light emitting area.

11. The optical touch panel assembly according to claim 10, wherein the light emitting area is defined in a center portion of the light reflective layer and surrounded by the light reflective area.

12. The optical touch panel assembly according to claim 1, wherein the touch panel is substantially rectangular and comprises a first diagonal line and a second diagonal line intersecting with the first diagonal line, the two light sensors are oppositely disposed at two corners of the touch panel and positioned at two ends of the first diagonal line of the touch panel.

13. The optical touch panel assembly according to claim 12, further comprising another light sensor disposed at one end of the second diagonal line of the touch panel.

* * * * *